UNITED STATES PATENT OFFICE.

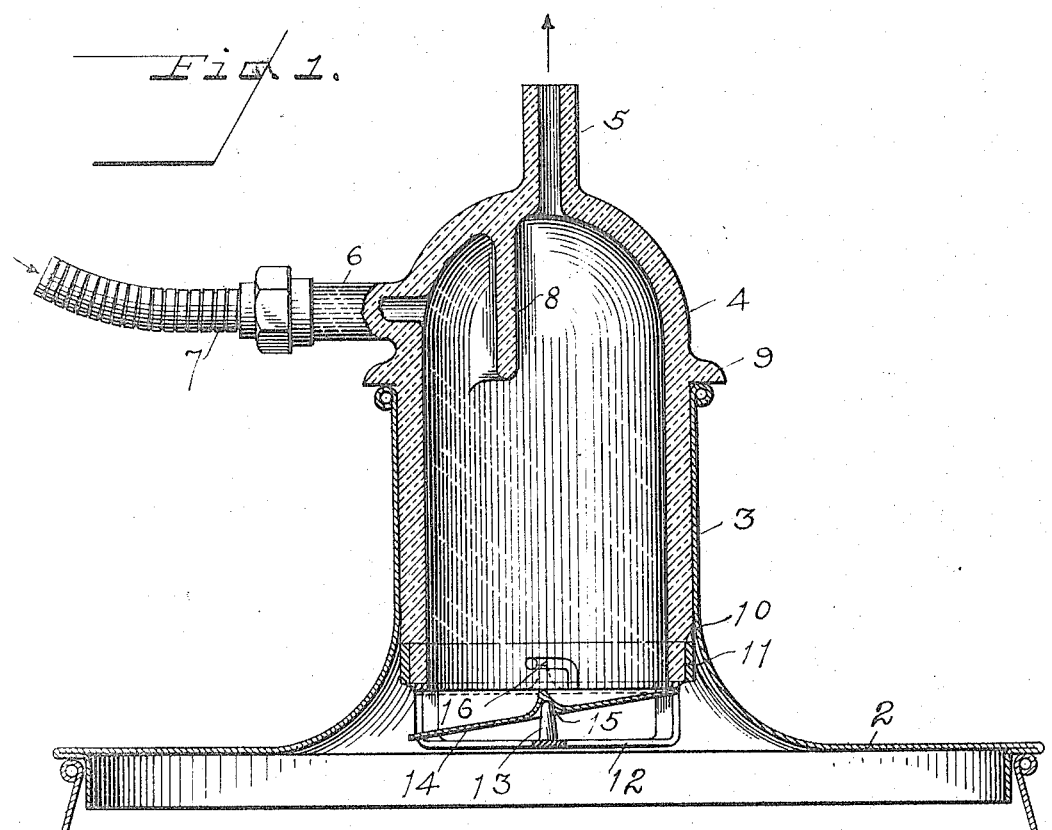
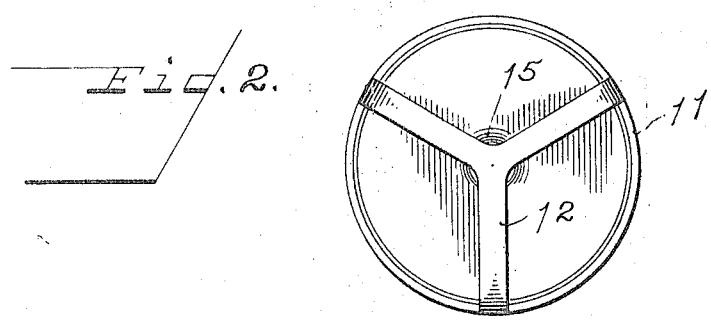

CARLOS DE LEON, OF DAYTON, OHIO, ASSIGNOR, BY MESNE ASSIGNMENTS, TO N. D. RUTHERFORD.

MILKING-MACHINE.

1,184,631.   Specification of Letters Patent.   Patented May 23, 1916.

Application filed October 1, 1914. Serial No. 864,507.

*To all whom it may concern:*

Be it known that I, CARLOS DE LEON, citizen of the United States, residing at Dayton, in the county of Montgomery and State of Ohio, have invented certain new and useful Improvements in Milking-Machines, of which the following is a specification.

My invention relates to mechanical milking apparatus and particularly to a suction or vacuum chamber therefor and is an amplification of the invention disclosed in the co-pending application of R. M. Miller, Serial No. 860,527, filed September 8, 1911.

The object of the invention is to simplify the structure as well as the means and mode of operation of such devices whereby they will not only be cheapened in construction, but will be more efficient in use, positive in operation, quick in action, easily operated and unlikely to get out of repair.

A further object of the invention is to provide a unitary device possessing continuous uninterrupted walls devoid of crevices or recesses wherein milk or foreign material may find lodgment, which will be open for easy cleansing and inspection and of suitable material such as glass, porcelain, or composition material which may be readily and thoroughly sterilized.

A further object of the invention is to provide means for supporting the vacuum chamber above the level of the container or reservoir in such manner that it may be easily and readily detached.

A further object is to provide a chamber having a transparent top or dome through which the action of the fluid within the chamber may be observed. A further object is to provide an improved form of free acting or floating valve controlled by variations of atmospheric pressure.

With the above primary and other incidental objects in view, as will more fully appear in the specification, the invention consists of the features of construction, the parts and combinations thereof, and the mode of operation, or their equivalents, as hereinafter described and set forth in the claims.

Referring to the drawings, Figure 1 is a vertical sectional view of the vacuum chamber forming the subject matter hereof applied to a receiver or container. Fig. 2 is a bottom plan view of the vacuum chamber.

Like parts are indicated by similar characters of reference throughout the several views.

As constructed at the present time, mechanical milking apparatus comprises a suction pump, a tubular connection designed for the attachment to the udder of the animal, and a receiving chamber to which the udder attachment leads and from which the pump exhausts the air. It has been found desirable in practice to make the chamber from which the air is exhausted and into which the milk is primarily received a separate unit independent of the pail or other receiver or reservoir into which the milk is discharged from said chamber. Any suitable style of suction pump may be employed and likewise any convenient and efficient form of udder attachment may be employed with the vacuum or suction chamber disclosed herein. The pump and udder attachments, forming no part of the present invention, have not been illustrated and will not be described inasmuch as such parts are familiar to persons skilled in the art of building and using mechanical milking apparatus.

The preferred form of suction pump is one of the single acting type. Such pump is preferably, though not necessarily, of a type to produce an intermittent suction action, to insure a quick action of the suction valve and secure a pulsating effect upon the udder connection. This reduces the vacuum within the chamber and causes the suction action to become intermittent, insures the quick action of the valve, and produces a pulsating effect upon the udder connection. It is obvious that the same effect may be produced by a suitable relief valve in the suction conduit or the pump. Such constructions, however, form no part of the present invention and are here mentioned merely for the purpose of facilitating the placing of the invention into effect.

Referring to the drawings, 1 is the pail or container preferably, though not necessarily, provided with a removable top or cover 2. Projecting perpendicular to the top or cover 2 is a sleeve 3.

The vacuum or suction chamber, forming the subject matter hereof, comprises a single integral tubular unit closed at its upper end and open at its lower end. This unit is preferably constructed of glass or other transparent material but if desired may be made of porcelain, composition, or even of metal. The upper or closed end of the tubular member is preferably, though not necessarily, dome shaped and is provided with an air outlet 5 with which the suction pump before mentioned is connected. It is further provided with a fluid inlet 6 with which the flexible metallic conduit 7 leading from the udder attachments is connected.

It has heretofore been customary to use rubber hose for connecting the udder attachments and the reservoir or receiving compartment. Such rubber hose has been found difficult to maintain in a sterile or sanitary condition and is frequently injured by being stepped upon by the animal or operator and further deteriorates very rapidly under the action of the fats in the milk. In the present construction these difficulties have been overcome by employing a flexible metallic conduit 7 which is not collapsible and may be thoroughly sterilized without injury and does not deteriorate under the action of the milk.

Interposed between the fluid inlet 6 and the air outlet 5 is a transverse diaphragm or baffle 8 extending across the upper portion of the chamber and extending beyond the inlet 6 which is thereby inclosed in a separate recess or compartment. The object of the baffle or diaphragm 8 is to intercept the inflowing milk and to prevent it from being entrained by the air exhausted from the chamber.

Upon its exterior the chamber 4 is provided with a peripheral flange or bead 9. The exterior proportions of the chamber are such that it will readily slide within the upright sleeve 3 of the top or cover 2 of the pail. The telescopic action of the chamber 4 and the sleeve 3 is limited by the engagement of the peripheral flange or bead 9 with the extremity of the sleeve. Thus the chamber is suspended or supported upon the upper end of the sleeve while the extended engagement of the chamber within the sleeve prevents any tipping or tilting action of the vacuum chamber in relation with the receiver or reservoir.

The lower end of the vacuum chamber 4 is open throughout its full extent thus permitting easy access to the interior for cleansing purposes and for inspection. The interior walls of the chamber are continuous or unbroken throughout thereby affording no lodgment for milk or dust particles or foreign matter which might render the device unsanitary.

At its lower end the chamber 4 is provided with a peripheral recess forming a shoulder or offset 10 in which is engaged a valve frame comprising an annular band 11 from which projects a pendent bridge comprising, preferably though not necessarily, three radially disposed arms 12 connected one to the other. It is obvious that the valve frame or cage may be provided with any suitable number of arms or that a single transverse bridge bar may be employed. The particular construction of the valve frame or cage is not essential.

Projecting centrally from the supporting frame is a stud 13 upon which normally rests a valve or closure plate 14 preferably of aluminum or other suitable light material. The valve or closure plate 14 is provided with a central depression 15 in which the extremity of the stud 13 normally engages. The valve or closure plate 14 is entirely independent and free from the vacuum chamber 4 and from the valve cage or support. It is free to reciprocate upon the stud 13 or to tip or tilt in any direction about such stud as a fulcrum. It is also free to be lifted from such stud and into contact with the lower edge of the vacuum chamber by atmospheric pressure when the air within the chamber is exhausted.

In operation the initial exhaustion of the chamber 4 by means of the suction pump before mentioned causes the valve or closure plate 14 to be lifted from its supporting stud 13 and to be seated upon the lower edge of the chamber, thereby closing the lower end thereof. The suction or vacuum produced in the chamber thereupon acts through the flexible metallic conduit 7 upon the udder connection to induce a flow of milk which is received in the chamber 4. The weight of the valve or closure plate together with that of the charge of milk resting thereon within the chamber 4 causes the plate 14 to drop from its seat upon the chamber and thereby discharge the milk contained therein. This unseating action is assisted and accelerated by the return air discharged from the suction pump which is returned to the vacuum chamber through the suction conduit thereby forcibly projecting the closure plate 14 from its seat and expelling the contents of the chamber. The valve frame is detachably connected to the chamber by means of a bayonet slot 16 or other suitable connection whereby it may be readily detached and the valve plate 14 removed for cleansing. It is to be noted that the valve support or cage offers no obstruction to the withdrawal of the chamber from the sleeve 3. By the use of the sleeve 3 the vacuum or suction chamber is supported entirely above the fluid line of the receiver or reservoir. It is not essential, however, that such an extended sleeve shall be employed. The vacuum or suction chamber described may be suspended through a simple opening in the top or cover of the reservoir in which case the device would be supported by the engagement of the peripheral flange 9 upon the portion of the lid surrounding the opening. However, the use of the extended sleeve not only supports the device above the fluid line but holds it against the tipping or tilting action thereby maintaining it in an upright position in which the valve plate 14 will be evenly balanced. By constructing the device of glass or other suitable transparent material the action of the fluid within the chamber may be readily observed through the transparent top or dome.

While the device is especially designed for use with milking apparatus, it is to be understood that it is not limited to such use but may form a part of a suction or pumping apparatus for various other uses. In view of its adaptability to other uses, the claims are not to be understood as limited to milking apparatus.

From the above description it will be apparent that there is thus provided a device of the character described, possessing the particular features of advantage before enumerated as desirable but which obviously is susceptible of modification in its form, proportion, detail construction or arrangement of parts without departing from the principle involved or sacrificing any of its advantages.

While in order to comply with the statute the invention has been described in language more or less specific as to certain structural features, it is to be understood that the invention is not limited to any specific details, but that the means and construction herein described comprise but one mode of putting the invention into effect, and the invention is therefore claimed broadly in any of its possible forms or modifications within the scope of the appended claims.

Having thus described my invention, I claim:

1. A vacuum chamber having a lateral fluid inlet near its top, an axial air outlet at its top, a valved fluid discharge orifice at its bottom, and a vertical baffle element in the angle between said fluid inlet and air outlet.

2. In an apparatus of the character described, a vacuum chamber composed of a cylindrical body portion open at its lower end and a dome-shaped top portion closing the upper end of said cylindrical body portion, said body and top portions being integrally combined as a unitary structure, and said top portion having an axially disposed air outlet orifice at its top, a lateral fluid inlet orifice disposed at a level below said outlet orifice, a baffle arranged vertically in the angle between said orifices, and a closure valve for said open lower end of the body.

3. In an apparatus of the character described, a vacuum chamber comprising a tubular body open at its lower end and closed at its upper end, said body being provided with a fluid inlet orifice and an air outlet orifice, a ring detachably engaging the lower end of the body, a frame supported by said ring below the lower open end of the body and a closure valve or plate arranged within said frame and controlling the lower open end of the body, said valve or plate being loosely mounted for universal pivotal motion upon said frame.

4. In an apparatus of the character described, a vacuum chamber comprising a tubular body open at its lower end and closed at its upper end, said body being provided with a fluid inlet orifice and an air outlet orifice, a ring detachably connected with the lower end of the body, a frame supported by the ring below the lower open end of the body, a stud projecting upwardly from said frame toward the open end of the body, and a normally inclined closure valve or plate loosely arranged within the frame and having a loose pivotal engagement with said stud.

5. In an apparatus of the character described, a vacuum chamber having an air outlet and fluid inlet and outlet orifices, an independent closure plate for the fluid outlet orifice, and a fulcrum for the plate engaged thereby when in open position.

6. In an apparatus of the character described, a vacuum chamber having an air outlet and fluid inlet and outlet orifices, an independent closure plate for the fluid outlet orifice, and a stud centrally located in relation with the plate upon which the plate rests when in open position.

7. In an apparatus of the character described, a vacuum chamber having an air outlet and fluid inlet and outlet orifices, and independent closure valve plate for the fluid outlet orifice, a pivotal support for said valve when in open position from which support the plate is lifted in its closing movement.

8. In an apparatus of the character described, a vacuum chamber having an air outlet and fluid inlet and outlet orifices, an independent closure plate for the fluid outlet orifice, and a centered support for said plate about which the plate is capable of both rotary and oscillatory movement.

9. In an apparatus of the character described, a vacuum chamber having an air outlet and fluid inlet and outlet orifices, an independent closure valve plate for the fluid outlet orifice, a detachable frame carried by the vacuum chamber, and a pivoting projection carried by the frame on which the closure plate is loosely supported.

10. In an apparatus of the character described, a vacuum chamber having an air outlet and fluid outlet and inlet orifices, an independent closure plate for the fluid outlet orifice, a supporting frame for the independent plate, and a projection on the frame forming a fulcrum for the plate about which the plate is free to oscillate in any direction.

11. In an apparatus of the character described, a vacuum chamber having an air outlet and fluid inlet and outlet orifices, an independent closure plate for the fluid outlet orifice, a support for the plate including a stud engaging the plate at a central point about which the plate is free to oscillate.

In testimony whereof, I have hereunto set my hand this 29th day of September A. D. 1914.

CARLOS DE LEON.

Witness:
J. D. CHAMBERLAIN.